United States Patent [19]  
Nakamura et al.

[11] 4,100,459  
[45] Jul. 11, 1978

[54] INDICATOR CIRCUIT FOR ELECTRONIC FLASH APPARATUS

[75] Inventors: Zenzo Nakamura, Urawa; Syohei Ohtaki, Yokohama; Tokuichi Tsunekawa, Yokohama; Tadashi Ito, Yokohama; Hiroshi Aizawa, Kawasaki; Takashi Uchiyama, Yokohama, all of Japan

[73] Assignee: Canon Kabushiki Kaisha, Tokyo, Japan

[21] Appl. No.: 671,736

[22] Filed: Mar. 30, 1976

[30] Foreign Application Priority Data

Apr. 8, 1975 [JP] Japan ................................. 50-42570

[51] Int. Cl.² .......................... G08B 5/38; H05B 41/26
[52] U.S. Cl. ..................................... 315/136; 315/134; 315/135; 315/241 P; 340/659
[58] Field of Search ............... 315/129, 133, 134, 135, 315/136, 149, 151, 157, 159, 241 P; 340/251, 252 R, 253 Q; 354/33, 35, 53, 127

[56] References Cited  
U.S. PATENT DOCUMENTS

| 3,340,426 | 9/1967 | Elliott | 315/241 P X |
| 3,626,401 | 12/1971 | Flieder et al. | 315/129 X |
| 3,688,664 | 9/1972 | Mashimo | 315/241 PX |
| 3,706,911 | 12/1972 | Wilwerding | 315/241 P X |
| 3,947,720 | 3/1976 | Breitkreuz | 315/241 P X |

Primary Examiner—Eugene R. LaRoche  
Attorney, Agent, or Firm—Toren, McGeady and Stanger

[57] ABSTRACT

An electronic flash apparatus is provided with a display element positioned in the view-finder of a photographic camera so that the operator is immediately aware if the flash tube has been fired in response to the closure of the synchronous switch. The light emitting operation of this display element is controlled by use of a signal generator arranged to be responsive to the occurrence of discharge through the flash tube of the flash apparatus. With this apparatus, therefore, the operator may rely upon the appearance of this display element to insure that the firing is effected by the flash apparatus even when the object-to-camera distance is relatively small.

13 Claims, 10 Drawing Figures

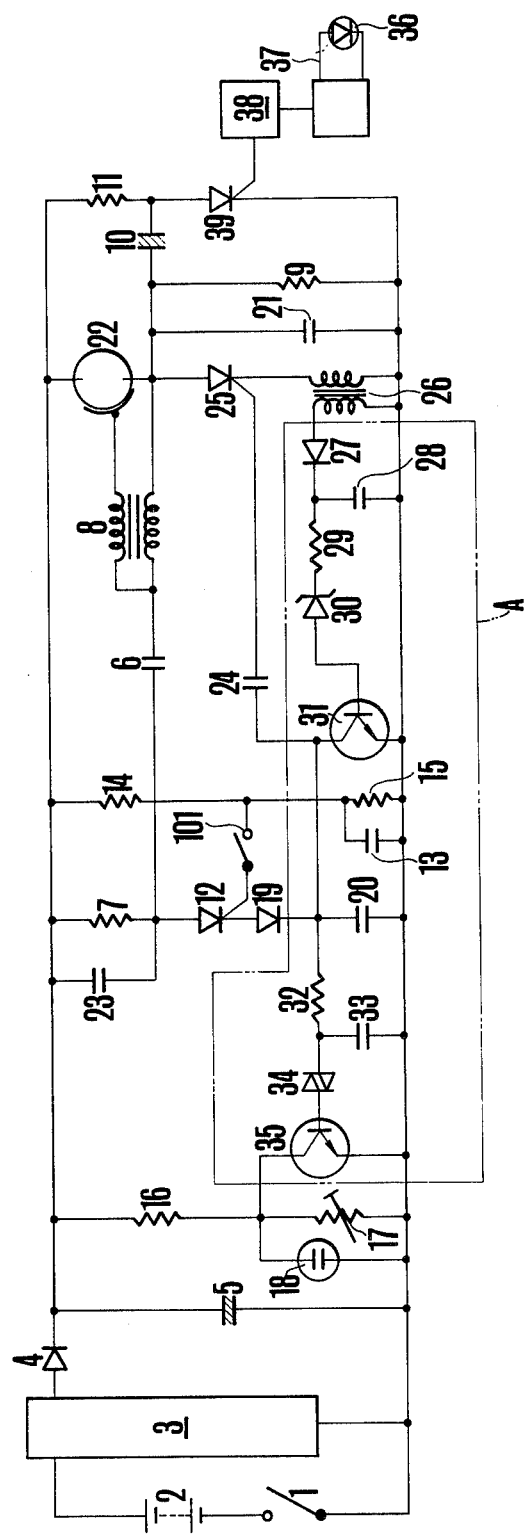

| DISTANCE | STATUS OF THE DISPLAY ELEMENT 43 | |
|---|---|---|
| | FLASH TUBE WHEN FIRED | FLASH TUBE REMAIN UNFIRED |
| SHORT | CONTINUOUS LIGHTING | INTERMITTENT LIGHTING |
| MEDIUM | CONTINUOUS LIGHTING | INTERMITTENT LIGHTING |
| LONG | CONTINUOUS LIGHTING | INTERMITTENT LIGHTING |

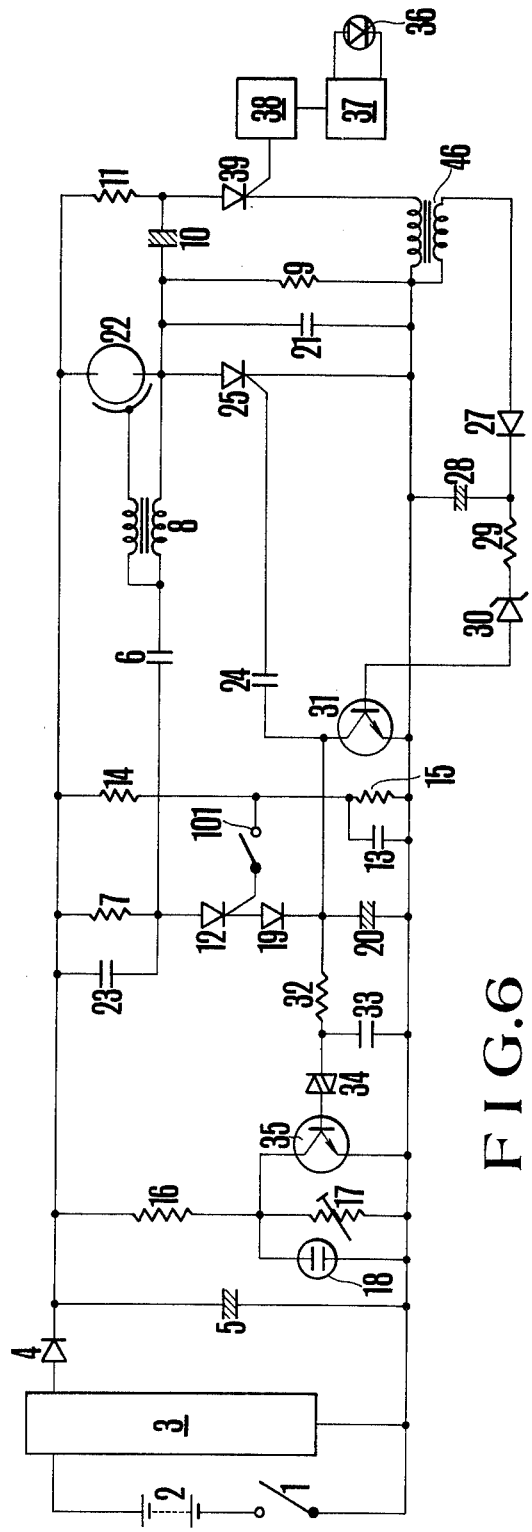

FIG.8

| STATUS OF THE DISPLAY ELEMENT 43 (50) | | |
|---|---|---|
| DISTANCE | FLASH TUBE WHEN FIRED | FLASH TUBE REMAIN UNFIRED |
| SHOT | CONTINUOUS LIGHTING (CONTINUOUS LIGHTING) | INTERMITTENT LIGHTING (CONTINUOUS LIGHTING) |
| MEDIUM | CONTINUOUS LIGHTING (CONTINUOUS LIGHTING) | INTERMITTENT LIGHTING (CONTINUOUS LIGHTING) |
| LONG | CONTINUOUS LIGHTING (CONTINUOUS LIGHTING) | INTERMITTENT LIGHTING (CONTINUOUS LIGHTING) |
| EXTREME LONG | INTERMITTENT LIGHTING (LIGHTED OFF) | INTERMITTENT LIGHTING (CONTINUOUS LIGHTING) |

FIG.9         FIG.10

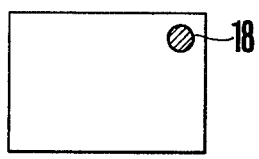
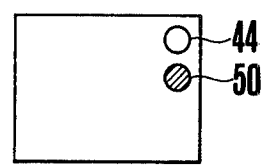

INDICATOR CIRCUIT FOR ELECTRONIC FLASH APPARATUS

BACKGROUND OF THE INVENTION

This invention relates to an electronic flash apparatus, and more particularly to a display device for indicating whether or not the flash tube of the electronic flash apparatus has been fired and whether or not the resultant flash lighting is sufficient for making a correct exposure as the object-to-camera is very large.

It is known to provide electronic flash apparatus of the type in which when the amount of light reflected from an object being photographed with flash illumination has reached a predetermined level, a switching element connected in series to a flash tube is turned to the off state to interrupt the discharging through the flash tube, as disclosed in British Pat. No. 1,376,880.

It is also known to incorporate into such a type of electronic flash apparatus a display device for indicating whether or not the flash tube has been fired. According to British Pat. No. 1,376,880, this device is constructed from a display element such as a neon lamp connected in parallel with a main capacitor for storing an electrical energy which is to be discharged through the flash tube to convert the electrical energy to a flash light energy.

With such a display device of the electronic flash apparatus, however, when an object being photographed is at a relatively short distance from the camera with the flash apparatus, the amount of electrical energy discharged from the main capacitor through the flash tube is so small that the voltage across the main capacitor does not drop largely enough to extinguish the display element despite of the fact that the flash tube has been fired, thus the display element being held in continuous lighting. As a result, the operator would be apprised as if the flash tube remains unfired, though the reverse is the case.

Further, the conventional display device for the electronic flash apparatus though having a function of indicating whether or not the flash tube has been fired even when the object is at a long distance is incapable of informing the operator of whether or not the correct exposure has been made on the photographic film associated with the camera under the resultant flash lighting condition as the object-to-camera distance is very long. For this reason, the photographer is apt to mistake the resultant flash exposure for the correct one.

SUMMARY OF THE INVENTION

An object of the present invention is to provide an electronic flash apparatus having a display device capable of indicating with high reliability whether or not the flash tube has been fired regardless of the fact that an object being photographed is at a relatively short distance.

Another object of the present invention is to provide an electronic flash apparatus having a display device which enables the photographer to be aware if the flash tube has been fired or remains unfired, and if the object-to-camera distance is so long that the resultant flash exposure is incorrect.

Still another object of the present invention is to provide an electronic flash apparatus having a display device in which a light emitting element connected in parallel to a storage capacitor on which an electrical energy is stored to be converted to a flash light energy within the flash tube is utilized as a display element for indicating whether the flash tube has been fired or remains unfired in response to the closure of the synchronous switch.

Another object of the present invention is to provide an electronic flash apparatus having a display device capable of indicating whether the object-to-camera distance is within the correct flash exposure derivable range, or beyond the longer limit thereof.

Other objects and features of the present invention will become apparent from the following detailed description taken in conjunction with the accompanying drawings in which:

BRIEF DESCRIPTION OF THE DRAWINGS

FIG. 1 is a circuit diagram of a first embodiment of an electronic flash apparatus according to the present invention.

FIG. 2 is a table of possible appearances of the display element of FIG. 1 dependent upon whether the flash tube has been fired or remains unfired with reference to the object-to-camera distance.

FIG. 5 is a circuit diagram of a third embodiment of an electronic flash apparatus according to the present invention.

FIG. 6 is a table similar to that of FIG. 2 but for the display element of FIG. 5.

FIG. 8 is a table similar to that of FIG. 2 but for the display element of FIG. 7.

FIG. 9 shows an arrangement of a single display element in the view-finder of a camera with which the flash apparatus of FIG. 1 is associated.

FIG. 10 shows an arrangement of two display elements in the view-finder of a camera with which the flash apparatus of FIG. 7 is associated.

DETAILED DESCRIPTION OF THE PREFERRED EMBODIMENTS

Figures 3, 4:
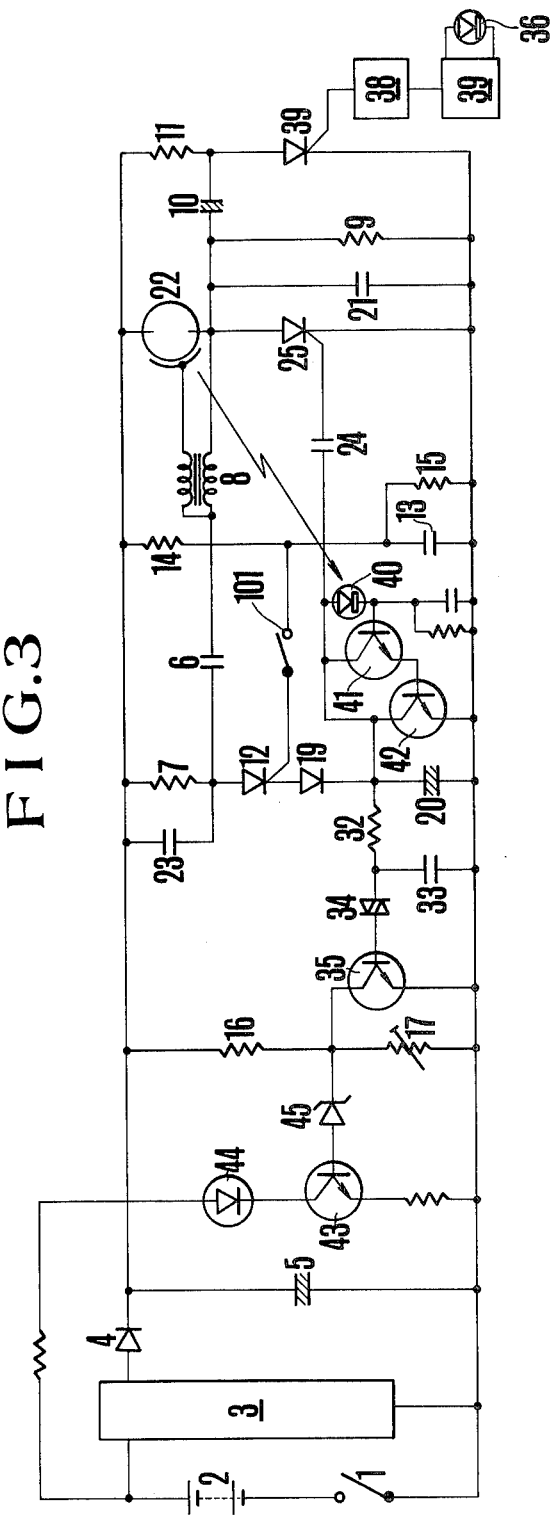
FIG. 3 is a circuit diagram of a second embodiment of an electronic flash apparatus according to the present invention.
FIG. 4 is a table similar to that of FIG. 2 but for the display element of FIG. 3.

In FIG. 1, which illustrates the circuit of an electronic flash apparatus embodying features of the invention, a power switch 1 connects a power source or battery 2 to a voltage-boosting converter 3. A diode 4 rectifies the boosted voltage of the converter 3 and applies it across a main capacitor 5 which stores electrical energy therein. A flash tube 22 is connected between the positive and negative buses through a switching element, in this instance, a thyristor 25 so that when the thyristor 25 is rendered conductive, the voltage stored on the main capacitor 5 appears across the flash tube 22.

A striking circuit for the flash tube 22 includes a trigger transformer 8 having a primary coil connected at one end thereof through a trigger capacitor 6 and a charge resistor 7 to the positive bus and at the opposite end thereof to the negative bus through a resistor 9, and having a secondary coil terminating at the trigger electrode of the flash tube 22, the resistor 9 being arranged to constitute part of a turn-off circuit for the thyristor 25 together with a commutation capacitor 10, a charge resistor 11 and a switching element or a second thyristor 39. Connected in series with the resistor 7 is a series-circuit comprising a third thyristor 12 having an anode connected to a junction point between the resistor 7 and trigger capacitor 6 and having a control electrode connected to a synchronous switch 101 at one terminal end thereof, the opposite terminal end of which is connected to the output terminal of a control energy storing circuit, a diode 19 and a capacitor 20, the parts 7, 12, 19 and 20 together with a capacitor 23 connected across the resistor 7 constituting an actuating circuit for the striking circuit, and the control energy storing circuit for the actuating circuit comprising a voltage divider with first and second resistors 14 and 15 and with their junction point being connected to the opposite terminal end of the synchronous switch 101 and a capacitor 13 connected across the resistor 15. The synchronous switch 101 is arranged to be cooperative with the X-contact of a camera not shown. When the third thyristor 12 is rendered conducting, a discharge circuit for the trigger capacitor 6 is established which can be traced from the positive pole of the capacitor 6 through the thyristor 12, diode 19, capacitors 20 and 21 and the primary coil of the trigger transformer 8 to the negative pole of the trigger capacitor 6. Such a conduction of the third thyristor 12 also results in application of a positive potential to the control electrode of the first thyristor 25 through a capacitor 24 with its opposite pole to that connected to the thyristor 25 being connected to the junction point between the diode 19 and capacitor 20.

A neon tube 18 is provided in combination of a voltage divider which is connected across the main capacitor 5 and which is made up of a fixed resistor 16 and a variable resistor 17 connected in series with each other, as being connected across this variable resistor 17 and as being positioned so that the photographer looking through the view-finder of the camera can view it as shown in FIG. 9 and he would be immediately aware if the neon tube 18 is lighted on, and, when so, if the lighting is continous or intermittent. One function of this neon tube 18 is therefore to indicate whether or not the charging of the main capacitor 5 attains to the normal firing voltage level prior to actuation of the striking circuit for the flash tube 22. In addition thereto, the neon tube 18 serves as a display element cooperating with a control circuit therefor to indicate whether or not the flash tube 22 has been fired in response to the closure of the synchronous switch as the camera shutter was released.

This control circuit enclosed within the dashed outline A for the neon tube 18 is provided with signal producing means, in this instance, a transformer 26 having a primary coil connected in the discharge path of the flash tube 22 when energized to generate a voltage in the secondary coil of the transformer 26. This induction voltage will result in an electric current flowing through a diode 27 into a capacitor 28. The positive pole of the capacitor 28 is connected through series-connected resistor 29 and a Zener diode 30 to the base electrode of a transistor 31 serving as a shunt means for storage means, in this instance, for the capacitor 20, the parts 27, 28, 29 and 30 constituting a leyal circuit for enabling the shunt means to perform the shunting operation during a predetermined time interval initiating at a time the electrical signal is generated in the transformer 26. The collector and emitter electrodes of transistor 31 are connected to the positive and negative poles of the capacitor 20 respectively. The control circuit further includes an oscillating dircuit comprising a resistor 32, a capacitor 33 connected across the capacitor 20 through the resistor 32, a trigger diode 34, and a transistor 35 having a base electrode connected through the trigger diode 34 to the junction point between the resistor 32 and capacitor 33 and having collector and emitter electrodes connecting across the neon tube 18.

In order to terminate the duration of firing of the flash tube 22 when the amount of flash light energy produced has reached a critical level dependent upon the flash exposure value, as has already been described in brief, there is provided the turn-off circuit associated with the first thyristor 25 and including the commutation capacitor 10 connected across the first thyristor 25 through the second thyristor 39 and the primary coil of the transformer 26 so that when the second thyristor 39 is rendered conducting, a reverse voltage is applied from the commutation capacitor 10 to the first thyristor 25, thereby the first thyristor 25 is rendered non-conducting, or turned off. The resistors 10 and 11 serve as a charging circuit for the commutation capacitor 10. The control electrode of the second thyristor 39 is connected to the output terminal of a flash energy control circuit which comprises a light-sensitive element 36 arranged to receive the light reflected from the object being photographed with flash illumination, an integrator 37 connected to the output of the light-sensitive element 36 for integrating the object brightness information, and a switching circuit 38 responsive to the output of the integrator 37 for conducting and non-conducting the second thyristor 39.

In the operation of the circuit of FIG. 1, assume that the synchronous switch 101 is open and rendered operative with the camera shutter. Under these conditions, when the power switch 1 is closed, the voltage of the battery 2 is increased in going through the converter 3 and then applied to the main capacitor 5. At the same time, the trigger capacitor 6, commutation capacitor 10 and capacitor 13 are also charged from the battery 2 and main capacitor 5. When the voltage stored on main capacitor 5 has reached a predetermined level, the neon tube 18 is lighted on to indicate that, from this time onwards, the normal firing of the flash tube 22 is available.

When the shutter release button not shown of the camera is depressed, the synchronous switch 101 is closed to apply a positive potential of the capacitor 13 to the gating control electrode of the third thyristor 12, thereby the primary coil of the trigger transformer 8 is energized in the form of a transient voltage change as the trigger capacitor 6 is discharged through the closed discharge circuit therefor. This changing voltage in the primary results in generation of a trigger voltage in the secondary coil which causes the striking of a small arc in the gas in the flash tube 22, in other words, the occurrence of a partial ionization of the gas in the flash tube 22. Such a conduction of the third thyristor 12 causes the charging of the capacitor 20 which in turn causes the application of a positive potential from the capacitor 20 to the gating control electrode of the first thyristor 25 through the capacitor 24. At this point, the first thyristor 25 is rendered conducting so that the voltage across the main capacitor 5 appears across the flash tube 22 and causes a discharging of the energy stored thereon through the flash tube 22 to emit a very intense flash of light. As the flash tube 22 is fired by an electric current flowing through the thyristor 25 and the primary coil of the signal producing transformer 26, an induction voltage is produced in the secondary coil thereof and is applied through the diode 27 to the capacitor 28 and also therefrom to the base electrode of the transistor 31 through the resistor 29 and Zener diode 30, thereby the transistor 31 is rendered conducting, causing a discharging of the capacitor 20 therethrough. As the voltage on the capacitor 20 drops, the transistor 35 is maintained in the Off state where the neon tube 18 is continuously lighted on.

Now assuming that the application of the trigger voltage to the trigger electrode of the flash tube 22 does not result in an avalanching of the ionization, that is, the emission of flash light, no current flows through the primary coil of the transformer 26 and, therefore, no voltage is generated in the secondary coil with the result that the transistor 31 remains in the non-conducting state to permit a first charging of the capacitor 33 of the oscillating circuit from the capacitor 20 as the storage means through the resistor 32. When the voltage on the capacitor 33 has reached the break-over voltage of the trigger diode 34, the transistor 35 as the second shunt means is rendered conducting to effect an instantaneous lighting-off of the neon tube 18 because the energy on the capacitor 33 is instantaneously discharged through the base and emitter electrodes of the transistor 35. Such a discharging of the capacitor 33 results in non-conduction of transistor 35, thereby the neon tube 18 is lighted on again. As the transistor 35 is turned off, a second charging of the capacitor 33 is initiated. Such a procedure repeats itself until the voltage on the storage on capacitor 20 drops below the break-over voltage of the trigger diode 34. In such a way, the neon tube 18 as the display element is intermittently lighted on to indicate that the flash tube 22 remains unfired despite of the fact that the striking circuit is actuated as may be encountered when the object being photographed is at a short distance from the flash apparatus.

As shown in FIG. 2, when the flash tube 22 has been fired, the appearance of the neon tube 18 as the display element is the continuous lighting independently of the flash apparatus-to-object distance. When the flash tube 22 has not been fired, gthe appearance of the display element 18 is the intermittent lighting independently of how long the above-identified distance is. It is to be understood that the display device of the electronic flash apparatus of the present invention informs the photographer of whether or not the flash tube has been fired in response to the actuation of the shutter release button of the camera without reference to the flash apparatus-to-object distance on which the assurance of firing of the flash tube 22 depends.

FIG. 3 shows the second embodiment of an electronic flash apparatus according to the present invention. The same numerals are employed in that figure to denote parts of that embodiment which remain substantially unchanged from the first embodiment of FIG. 1. In the second embodiment, instead of using a transformer as the signal producing means, a light sensitive element 40 is used as arranged to receive directly the flash light emitted from the fired flash tube 22, while instead of using a neon tube as the display element, a light emitting diode 44 is used.

The light sensitive element 40 connects the base and collector electrodes of a transistor 41. The emitter electrode of the transistor 41 is connected to the base electrode of a transistor 42 corresponding to the transistor 31 of FIG. 1 as the first shunt means.

The light emitting diode 44 is connected at its one end through a resistor to the positive terminal of the battery 2 and at the opposite end to the collector electrode of a transistor 43 with the base electrode being connected through a Zener diode 45 to the junction point of the voltage divider 16, 17 and with the emitter electrode being connected through a resistor to the negative bus.

With this circuit of FIG. 3, when the flash tube 22 is fired, the light sensitive element 40 turns on the transistors 41 and 42, thereby the transistor 35 is maintained in the Off state as described in detail in connection with the first embodiment of FIG. 1 to energize the light-emitting diode 44 from the battery 2 through the conducted transistor 43.

On the other hand, when the flash tube 22 has not been fired despite of the fact that the synchronous switch is closed, the transistors 41 and 42 remain in their Off state to result in intermittent energization of the light-emitting diode 44.

FIG. 5 shows the third embodiment of an electronic flash apparatus according to the present invention adapted to the purpose of indicating to the photographer whether an object being photographed with flash illumination is located beyond or within the distance for which a correct flash exposure of the photographic film ssociated with the camera can be made in addition to the indication of whether or not the flash tube has been fired in response to the shutter release. The same numerals are employed to denote similar or like parts to those shown in FIG. 1, but only one change is made in the arrangement of a transformer as the signal producing means as the primary coil of the transformer 46 is connected in the discharge path of the commutation capacitor 10 to detect the effective operation of the turn-off circuit.

The operation of the circuit of FIG. 5 is as follows. Now assuming that the object being photographed is located within the distance for which the correct flash exposure can be made, when the flash tube 22 is fired in response to the closure of the synchronous switch 101, the third thyristor 39 is rendered conducting in a time interval shorter than the maximum possible firing duration of the flash tube 22 by the output of the switching circuit 38 as the light reflected from the object being photographed with the flash illumination is received by the photosensitive element 36 and then integrated by the integrator 37 to a predetermined level. At this point, the energy on the commutation capacitor 10 is discharged through the thyristor 39 and the primary coil of the transformer 46 to apply a reverse voltage to the second thyristor 25, thereby the duration of firing of the flash tube 22 is terminated. This current flow in the primary coil of the transformer 46 is reflected in a voltage generated in the secondary coil thereof to which the capacitor 28 is charged. The voltage on the capacitor 28 is then applied to the base electrode of the transistor 31 to permit a discharging of the capacitor 20 which results in non-conduction of the transistor 35. Viewing the continuous lighting of the neon tube 18, the photographer is informed of the fact that the flash tube has been fired in response to the shutter release. When it has happened that the flash tube remains unfired despite of the fact that the camera shutter is released, no electrical signal is produced in the secondary coil of the transformer 46 to result in intermittent lighting of the neon tube 18 as described in connection with the first embodiment.

Alternatively assuming that the object being photographed is located beyond the above-identified distance, the switching circuit 38 produces no output so that the third thyristor 39 remains non-conducting during the full discharging of the stored energy through the flash tube 22. As a result, the transistor 31 is maintained in the Off state. In so far as the foregoing description is concerned, it has been explained that when the transistor 31 is Off, the appearance of the neon tube 18 is intermittent lighting. Unlike this, the instant case results in the lighting-off of the neon tube 18 because of the full discharging of the energy stored on the main capacitor 5 before the closure of the camera shutter, thereby the photographer being informed of the fact that although the flash tube 22 has been fired, an under-exposure of the film not shown of the camera will be resulted, because of the insufficient flash light energy produced from the electronic flash apparatus.

Figure 7:
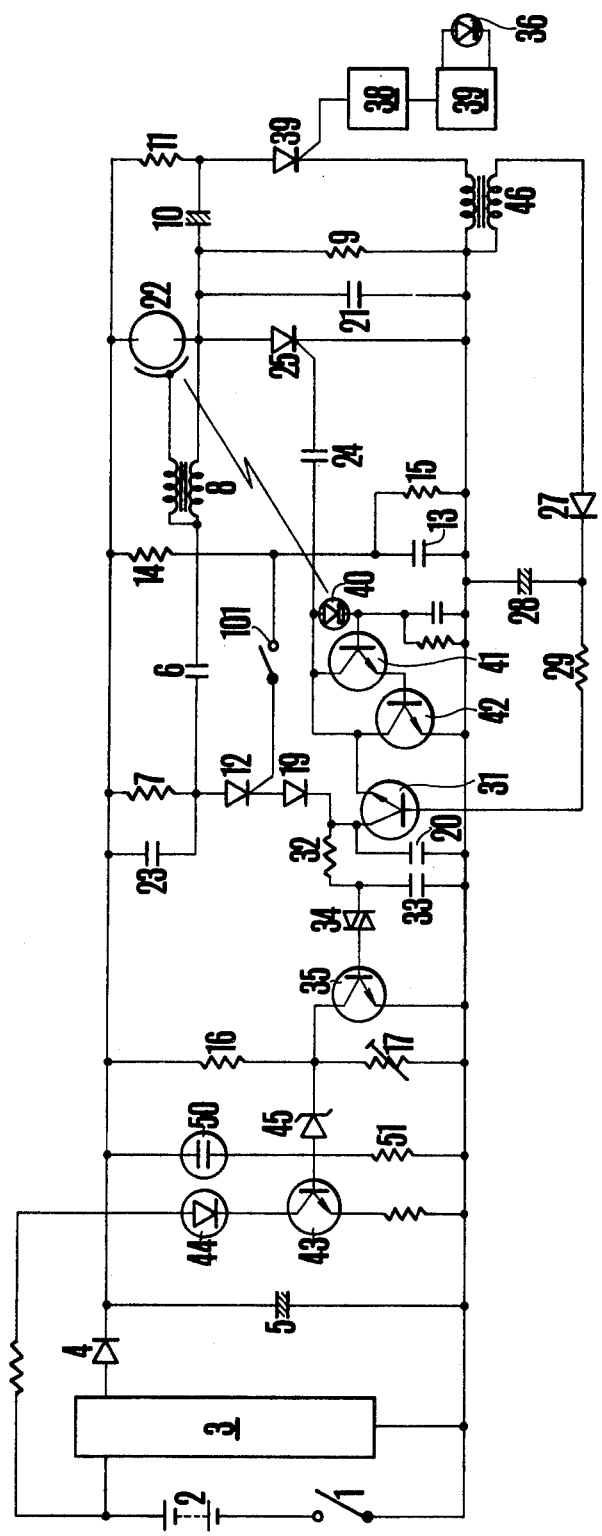
FIG. 7 is a circuit diagram of a fourth embodiment of an electronic flash apparatus according to the present invention.

FIG. 7 shows the fourth embodiment of an electronic flash apparatus according to the invention adapted to the simultaneous indications of whether or not the flash tube has been fired and whether the object being photographed is located beyond or within the distance for which the correct flash exposure can be made. For this purpose, there are provided two display elements 44 and 50 positioned adjacent to each other in the viewfinder of the camera as shown in FIG. 10. The same numerals are employed to denote similar or like parts to those shown in FIGS. 3 and 5. The essential change is that the short-circuiting of the capacitor 20 is controlled by the combined signals from the light sensitive element 40 and the transformer 46 associated with the turn-off circuit. The emitter electrode of the transistor 31 which is controlled by the voltage generated in the secondary coil of the transformer 46 is connected to the collector electrode of the transistor 42 which is controlled by the flash light produced from the fired flash tube 22.

The operation of the circuit of FIG. 7 is as follows. Now assuming that the flash tube 22 is fired when it was triggered and that the object being photographed is located within the above-identified range, when the amount of flash light energy as sensed by the photosensitive element 36 has reached a critical level dependent upon the correct flash exposure value, the switching circuit 38 produces a terminating signal which is applied to the gating control electrode of the second thyristor 39, thereby the transistor 31 is rendered conducting by the induction voltage generated in the secondary coil of the transformer 46. On the other hand, the transistors 41 and 42 are rendered conducting by the output of the light sensitive element 40 as the flash tube 22 is fired to emit a flash light. As a result, the energy on the capacitor 20 is discharged through the collector and emitter of the transistor 31 and then through the collector and emitter of the transistor 42, with the result that the transistor 35 is maintained in the Off state to permit the continuous lighting of the light-emitting diode 44.

Alternatively assuming that the flash tube 22 has not been fired when it was triggered, the transistors 41 and 42 remain non-conducting so that when the transistor 31 is rendered conducting by the signal from the transformer 46, the discharging circuit for the capacitor 20 is not established to cause the intermittent conduction of the transistor 35 as described in detail in connection with the embodiment of FIG. 3, thereby the intermittent lighting of the diode 44 results. In the both cases, the neon tube 50 connected in parallel with the main capacitor 5 is lighted on as depicted in the table of FIG. 8 independently of whether or not the flash tube 22 has been fired when it is triggered.

On the second alternative assumption that the flash tube 22 has been fired when it was triggered but the object being photographed is located beyond the above-identified distance,while the transistors 41 and 42 are rendered conducting by the output of the element 40, the transistor 31 remains non-conducting as no induction voltage is generated in the secondary coil of the transformer 46. In this case, also the capacitor 20 is not discharged to result in intermittent lighting of the diode 44, and the neon tube 50 is lighted off because of the full discharging of the energy stored on the main capacitor 5.

It is to be noted that in order to indicate the fact that the object being photographed is located at a very long distance from the electronic flash apparatus, it is sufficient to provide only one display element or diode 44 as is understandable from FIG. 8, but the simultaneous indications of whether or not the flash tube 22 has been fired when it was triggered or and whether or not the object being photographed was located at a very long distance requires the provision of two display elements 44 and 50 at a time in the flash apparatus.

It will be seen from the foregoing description that the present invention provides an electronic flash apparatus having a display device capable of indicating either or both of the fact that the flash exposure has been made with the firing of the flash tube and the fact that the reverse is the case even when the object being photographed is located at a short distance from the flash apparatus with high reliability to reduce the percentage of photographs taken with the flash device which will be found unacceptable because of having not been aware of the non-firing of the flash tube and not taking into account the very long distance between the object and the flash apparatus.

What is claimed is:

1. An electronic flash apparatus comprising:
   (a) a flash means for producing a flash light;
   (b) an energy supply circit connected to said flash means for applying to said flash means electric energy which is converted to light energy in said flash means;
   (c) a detecting circuit for detecting an output voltage of the energy supply circuit and producing an output signal when the output voltage of said energy supply circuit has reached a predetermined voltage level;
   (d) display means having first and second states, which assumes the first state in response to the output signal from said detecting circuit;
   (e) signal producing means connected in the discharge path of said energy supply circuit upon response to the ionization of said flash means to produce an electrical signal; and
   (f) control means connected to said display means and responsive to the electrical signal from said signal producing means for controlling the output stage of said display means.

2. An electronic flash apparatus according to claim 1, wherin said signal producing means includes a transformer means.

3. An electronic flash apparatus according to claim 1, wherein said detecting circuit consists of a resistor divider.

4. An electronic flash apparatus according to claim 1, wherein said transformer means has a primary winding connected in the discharge path of said energy supply circuit and a secondary winding connected to an input terminal of said control means.

5. An electronic flash apparatus according to claim 4, wherein said display means consists of a neon lamp.

6. An electronic flash apparatus according to claim 1, wherein said control means includes;
    (a) storage means arranged to be charged at the start coinciding with the occurrence of a triggering impulse which results in an initiation of firing of said flash means,
    (b) oscillator means connected to the output terminal of said storage means upon attainment of the voltage across said storage means to a predetermined level for producing an oscillating output signal which is applied to said display means causing intermittent appearance of the display therefrom, and
    (c) a discharge circuit connected to said storage means and responsive to the electrical signal from signal producing means to discharge said storage means so as to remain at the first stage of said display means.

7. An electronic flash apparatus according to claim 6, wherein said oscillator means includes;
    (a) a second shunt means having a control electrode and two main electrodes connected across the display means, and
    (b) a trigger diode connected between the control electrode of said second shunt means and said storage means.

8. An electronic flash apparatus according to claim 6, wherein said discharge circuit includes a shunt means connected across the storage means and delay means connected between said shunt means and said signal producing means and responsive to the electrical signal to enable said shunt means to operate during a predetermined time interval.

9. An electronic flash apparatus according to claim 8, wherein said shunt means includes transistor means having collector and emitter electrodes connected across the storage means and a base electrode.

10. An electrode flash apparatus comprising:
    (a) a flash means for producing a flash light with which an object being photographed is illuminated;
    (b) an energy source connected to said flash means for applying to said flash means an electric energy which is converted to a light energy in said flash means;
    (c) switching means connected in series to a series circuit of said flash means and said energy source, said switching means having a control electrode;
    (d) trigger means arranged to trigger said switching means in response to an actuation of a synchronous switch;
    (e) light measuring means receptive of the light reflected from said object and responsive to the attainment of the measured light value to a predetermined level for producing a terminating signal;
    (f) a turn-off circuit connected between said light measuring means and said switching means upon response to the terminating signal to turn-off said switching means;
    (g) a detecting circuit for detecting an output voltage of the energy source and producing an output signal when the output voltage of said energy source has reached a predetermined voltage level;
    (h) display means having first and second states which gets into the first stage in response to the output signal from said detecting circuit;
    (i) signal producing means connected in the discharge path of said energy source upon response to the ionization of said flash means to produce an electrical signal, and
    (j) control means connected to said display means and responsive to the electrical signal from said signal producing means for controlling the output state of said display means.

11. An electronic flash apparatus comprising:
    (a) a flash means for producing a flash light;
    (b) an energy source connected to said flash means for applying to said flash means an electric energy which is converted to a light energy in said flash means;
    (c) a detecting circuit for detecting an output voltage of the energy source and producing an output signal when the output voltage of said energy source has reached a predetermined voltage level;
    (d) display means having first and second states, which gets into the first state in response to the output signal from said detecting circuit;
    (e) signal producing means provided at a position where it receives directly the flash light from said flash means so as to produce an electrical signal in response to the flash light produced by said flash means, and
    (f) control means connected to said display means and responsive to the electrical signal from said signal producing means for controlling the output stage of said display means.

12. An electronic flash apparatus according to claim 11, wherein said signal producing means includes light sensitive means.

13. An electronic flash apparatus according to claim 11, wherein said control means includes;
    (a) storage means arranged to be charged at the start coinciding with the occurrence of a triggering impulse which results in an initiation of firing of said flash means,
    (b) oscillator means connected to the output terminal of said storage means upon attainment of the voltage across said storage means to a predetermined level for producing an oscillating output signal which is applied to said display means causing intermittent appearance of the display therefrom, and
    (c) a discharge circuit connected to said storage means and responsive to the electrical signal to discharge said storage means.

* * * * *